United States Patent [19]

Kawasaki et al.

[11] Patent Number: 5,654,832

[45] Date of Patent: Aug. 5, 1997

[54] ILLUMINATION OPTICAL SYSTEM FOR MICROSCOPES

[75] Inventors: Kenji Kawasaki, Musashimurayama; Kazuo Kajitani, Hachioji, both of Japan

[73] Assignee: Olympus Optical Co., Ltd., Tokyo, Japan

[21] Appl. No.: 536,104

[22] Filed: Sep. 29, 1995

[30] Foreign Application Priority Data

Sep. 30, 1994 [JP] Japan .................. 6-236934

[51] Int. Cl.$^6$ .................. G02B 9/06; G02B 21/06
[52] U.S. Cl. .................. 359/794; 359/385
[58] Field of Search .................. 359/362, 368, 359/385–390, 641, 738–740, 793–794, 798–800

[56] References Cited

U.S. PATENT DOCUMENTS 2,738,708  3/1956  Rosin .................. 359/385

FOREIGN PATENT DOCUMENTS

| 2910747 | 9/1979 | Germany | 359/385 |
| 3113843 | 1/1982 | Germany | 359/385 |
| 5134190 | 5/1993 | Japan . | |
| 1162911 | 9/1969 | United Kingdom | 359/385 |

Primary Examiner—Thong Nguyen
Attorney, Agent, or Firm—Cushman, Darby & Cushman IP Group of Pillsbury Madison & Sutro LLP

[57] ABSTRACT

An illumination optical system for microscopes is constructed so that in a transmissive Köhler illumination optical system having a light source, a condenser lens system, and an aperture stop, the condenser lens system includes, in order from the side of incidence of light, a first lens unit having a positive lens and a negative lens, with a positive power as a whole, and a second lens unit having a negative lens and a positive lens, with a positive power as a whole. The aperture stop is placed between the first and second lens units, and the illumination optical system satisfies the condition:

$$R_1/R_2 > 0$$

where $R_1$ is the radius of curvature of the foremost surface of the second lens unit and $R_2$ is the radius of curvature of the rearmost surface of the second lens unit.

8 Claims, 3 Drawing Sheets

ILLUMINATION OPTICAL SYSTEM FOR MICROSCOPES

BACKGROUND OF THE INVENTION

1. Field of the Invention

This invention relates to an illumination optical system for use in microscopes.

2. Description of Related Art

As a transmissive illumination optical system for microscopes, a Köhler illumination optical system is known. This optical system comprises, at least, a light source, a collector lens, a field stop, an aperture stop, and a condenser lens system. The image of the light source is projected at the position of the aperture stop by the collector lens, and this projected image of the light source is further projected, as a secondary light source, on the pupil of an objective lens by the condenser lens system. In this way, an object is illuminated. On the other hand, the image of the field stop is projected on a sample surface by the condenser lens system. Thus, according to the Köhler illumination optical system, the field of illumination is definitely determined and unevenness of illumination is lessened.

In ordinary microscopes, the position of the pupil of the objective lens is frequently set at infinity, and thus it is common practice that the illumination optical system is placed to be telecentric (so that a chief ray is parallel to the optical axis). This is because, if not, an eclipse will be caused when the aperture stop is stopped down. Hence, in most cases, the aperture stop is disposed to coincide with the position of the object focal point of the condenser lens system.

Microscopes are used in a relatively wide range of magnifications of 1–100×for observation. Since, however, a magnification of 1×is entirely different from a magnification of 100×in size of the visual field and numerical aperture of the objective lens, it is difficult that a single optical system is made to satisfy conditions for realizing the Köhler illumination optical system at any magnification. Therefore, the illumination optical system is divided into several steps according to magnification so that optical systems varying with magnification are used to satisfy the conditions of the Köhler illumination at any magnification.

As an example, an apparatus disclosed in Japanese Patent Preliminary Publication No. Hei 5-134190 is quoted. This apparatus is provided with an illumination optical system for high magnification including a high-magnification aperture stop and a high-magnification condenser lens system; and an optical system for low magnification including a low-magnification aperture stop and a low-magnification condenser lens system. One of these optical systems is selectively inserted in an illumination path to thereby secure a Köhler illumination optical system which is applicable over a wider magnification range (also, the light source, the collector lens, and the field stop are used at either high or low magnification).

In this illumination optical system, however, the low-magnification condenser lens system is constructed with a first positive lens, a negative lens, and a second positive lens, and the low-magnification aperture stop is placed close to the negative lens. Since the second positive lens for projecting the aperture stop at infinity is composed of lens elements having a relatively simple arrangement, aberration is not completely corrected. Consequently, the problem is encountered that the amount of light in the marginal portion is insufficient or unevenness of illumination is produced.

Referring now to FIGS. 1 and 2, the cause of this problem is explained. Each of these figures shows an arrangement behind the aperture stop of the illumination optical system. Reference numeral 1 represents an aperture stop; 2 a second positive lens of a condenser lens system; and 3 a sample surface. Numeral 4 denotes a maximum image height on the sample surface 3; 5 denotes a middle image height; and symbol $F_f$ denotes an object focal point of the second positive lens 2. The above problem is caused by the fact that the spherical aberration of the second positive lens 2 is not completely corrected. The second positive lens 2 has large negative spherical aberration, and thus, in order to satisfy the condition of the telecentric system in the marginal portion of the visual field (namely, to make a chief ray 6 perpendicular to the sample surface 3), it is only necessary to shift the position of the aperture stop 1 closer to the second positive lens 2 than the position of the object focal point $F_f$ of the second positive lens 2. This arrangement increases an angle θ made by the chief ray 6 with an optical axis $L_c$, and by the cosine law, the amount of light in the marginal portion of the visual field is considerably reduced compared with the case where the aperture stop 1 is located at the position of the object focal point $F^f$ of the second positive lens 2.

As shown in FIG. 2, a chief ray 7 of the middle image height 5 crosses the optical axis $L_c$ between the object focal point $F_f$ of the second positive lens 2 and the aperture stop 1. Thus, if the aperture stop 1 is stopped down to diminish its diameter, an upper marginal ray will be eclipsed by the aperture stop 1 and the amount of light at the middle image height 5 will be decreased. This appears as unevenness of illumination.

Also, if correction for chromatic aberration is incomplete, unevenness of color is produced in addition to the above difficulty. This makes it impossible to use the optical system.

An example of the condenser lens system (for low magnification) used in the prior art illumination optical system is shown in FIG. 3. A conventional condenser lens system 10 includes a first lens unit $G_1$ consisting of a positive lens $L_1$ and a negative lens $L_2$ and a second lens unit $G_2$ consisting of a positive lens $L_3$. The aperture stop 2 is placed close to the first lens unit $G_1$ between the first lens unit $G_1$ and the second lens unit $G_2$. Symbol $F_f$ denotes an object focal point of the second lens unit $G_2$ and $F_b$ denotes a combined image focal point of the first and second lens units $G_1$ and $G_2$.

The following is the numerical data of lenses constituting the condenser lens system 10 used in the conventional illumination optical system.

| | | | |
|---|---|---|---|
| $r_1 = 23.83$ | | | |
| | $d_1 = 8.0$ | $n_1 = 1.6779$ | $v_1 = 55.33$ |
| $r_2 = 108.255$ | | | |
| | $d_2 = 16.0$ | | |
| $r_3 = -22.599$ | | | |
| | $d_3 = 2.0$ | $n_3 = 1.64769$ | $v_3 = 33.8$ |
| $r_4 = -267.886$ | | | |
| | $d_4 = 30.7$ | | |
| $r_5 = 39.982$ | | | |
| | $d_5 = 5.5$ | $n_5 = 1.7725$ | $v_5 = 49.66$ |
| $r_6 = -74.922$ | | | |
| | $d_6 = 9.2$ | | |

Focal length $f_1$ of the first lens unit $G_1$=100.026 Focal length $f_2$ of the second lens unit $G_2$=74.9 Focal length f of the condenser lens system 10=67.352 Effective illumination area D of the object surface=22

In the numerical data which is mentioned above and will be described later, $r_1, r_2, \ldots$ represent radii of curvature of individual lens surfaces; $d_1$, $d_2$, ... thicknesses of individual lenses or spaces therebetween; $n_1$, $n_2$, ... refractive indices of individual lenses; and $v_1$, $v_2$, ... Abbe's numbers of individual lenses.

TABLE 1

|  | Theoretical value | Illumination optical system of prior art | |
|---|---|---|---|
|  |  | When AS is opened (*1) | When AS is stopped down (*2) |
| On-axis | 100 | 100 | 100 |
| Middle | 99 | 92 | 76 |
| Margin | 96 | 94 | 78 |

In Table 1, the theoretical values that the amount of light on the optical axis is taken as 100 and the amount of light at each image height is taken as zero in aberration, are colapared with the amounts of light of the conventional illumination optical system. The column of the conventional illumination optical system gives a case (*1) where the aperture stop (AS) is set so that the numerical aperture (NA) is 0.08 and another case (*2) where the AS is stopped down so that the NA is 0.04, under the conditions that the NA of the objective lens is 0.04 and the chief ray at the maximum image height is parallel to the optical axis. It is seen from the above data that in the conventional illumination optical system, the amount of light in the marginal portion is materially decreased compared with that on the optical axis, brightness at the middle image height is reduced, and at the same time, unevenness of illumination is produced.

SUMMARY OF THE INVENTION

It is, therefore, an object of the present invention to provide an illumination optical system for microscopes which has a condenser lens system capable of holding the amount of light in the marginal portion to a value close to the theoretical value with respect to the amount of light on the optical axis and suppressing the production of uneven of illumination and color.

In order to achieve this object, the illumination optical system for microscopes according to the present invention is constructed so that, in a transmissive Köhler illumination optical system having a light source, a condenser lens system, and an aperture stop, the condenser lens system comprises, in order from the side of incidence of light, a first lens unit including a positive lens and a negative lens, with a positive power as a whole, and a second lens unit including a negative lens and a positive lens, with a positive power as a whole, so that the aperture stop is placed between the first lens unit and the second lens unit, and satisfies the condition:

$$R_1/R_2 > 0 \quad (1)$$

where $R_1$ is the radius of curvature of the foremost surface of the second lens unit and $R_2$ is the radius of curvature of the rearmost surface of the second lens unit.

Further, calling $f_1$ the focal length of the first lens unit, $f_2$ the focal length of the second lens unit, $f$ the entire focal length of the condenser lens system, L the distance from the foremost surface of the condenser lens system to the rear focal point of the condenser lens system, and D the diameter of the effective illumination area of an object surface, the illumination optical system of the present invention satisfies conditions:

$$f_1/f_2 > 0.5 \quad (2)$$

$$f/L > 0.9 \quad (3)$$

$$f_2/D > 1.7 \quad (4)$$

Still further, it is desirable that when the maximum Abbe's number of the positive lens included in the second lens unit is represented by vP and the minimum Abbe's number of the negative lens included in the second lens unit is represented by vn, the illumination optical system of the present invention satisfies conditions:

$$vP > 45, vn < 30 \quad (5)$$

As mentioned above, the illumination optical system of the present invention is designed so that the condenser lens system comprises, in order from the side of incidence of light, the first lens unit and the second lens unit, between which the aperture stop is disposed. The spherical aberration of lenses constituting the second lens unit is corrected in such a way that the object focal point of the second lens unit is made to coincide with the position of the aperture stop.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
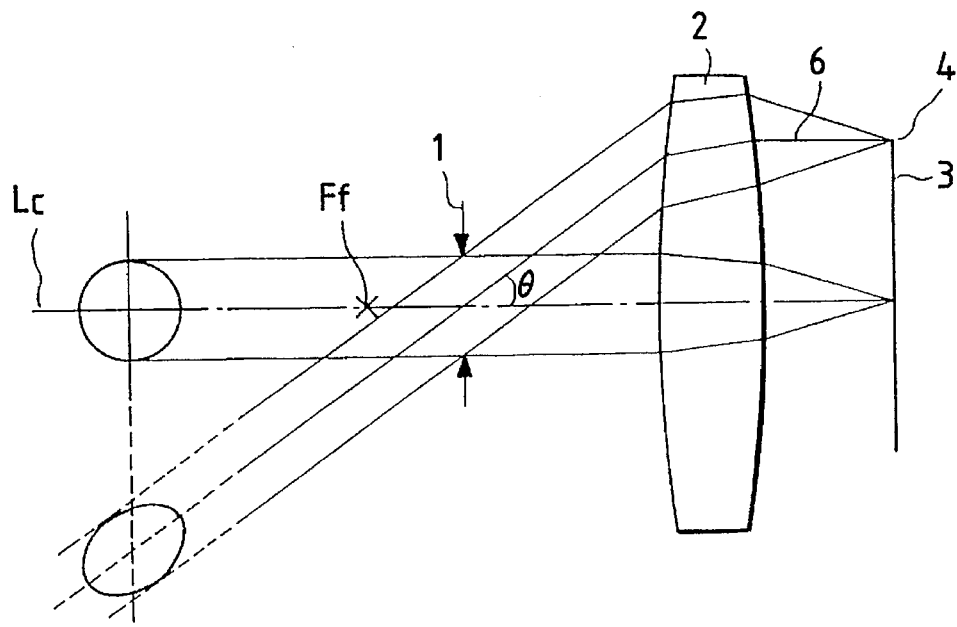
FIGS. 1 and 2 are views for explaining the arrangement of a prior art illumination optical system for microscopes.
Figure 2:
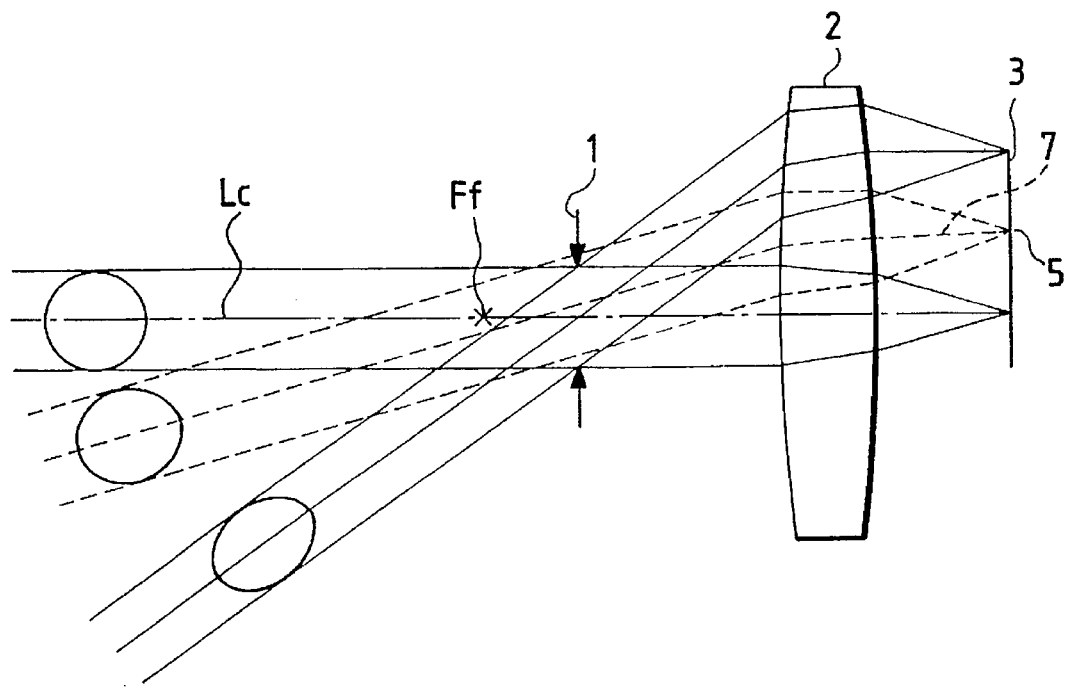
Figure 3:
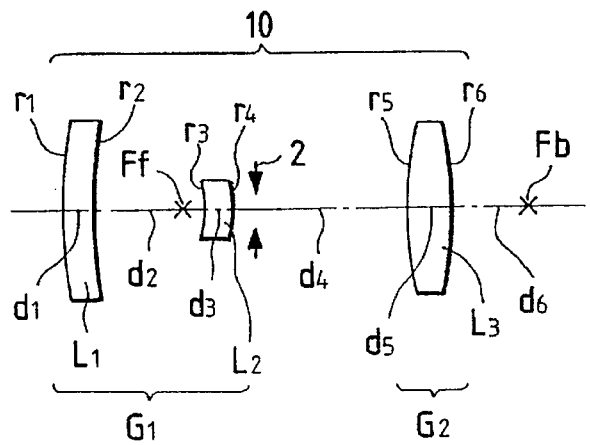
FIG. 3 is a view showing an example of the arrangement, developed along the optical axis, of a condenser lens system used in the prior art illumination optical system for microscopes.

In the illumination optical system of the present invention, the first lens unit of the condenser lens system has a special function of projecting the image of the field stop on the sample surface and is provided with a negative lens to correct the spherical aberration of the image of the field stop.

In order to suppress the production of spherical aberration from which the second lens unit of the condenser lens system suffers at the position of the aperture stop, it is desirable that the second lens unit is also provided with a negative lens. Thus, in the condenser lens system used in the illumination optical system of the present invention, the second lens unit is designed to have a meniscus form, as a whole, with the concave side facing incident light. For this purpose, it is necessary to satisfy Eq. (1).

By the above arrangement, the production of spherical aberration is obviated, and the coincidence between the object focal point of the second lens unit and the position of the aperture stop can be improved. If the value of Eq. (1) is below zero, spherical aberration cannot be favorably corrected, resulting in defects.

In the illumination optical system of the present invention, in order that the overall length of the condenser lens system is reduced to increase its focal length and the aperture stop is contained in the condenser lens system, it is favorable to satisfy Eqs. (2) and (3).

Eqs. (2) and (3) define the power distribution and telephoto ratio of the condenser lens system. If the condenser lens system is constructed to satisfy Eqs. (2) and (3), thereby reducing the telephoto ratio, it becomes possible to increase the focal length while reducing the entire length and to illuminate a wide visual field. Moreover, it also becomes possible to properly determine the power distribution of the condenser lens system and to provide the aperture stop between the first and second lens units thereof.

Unless the F number $f_2/D$ of the second lens unit is larger than 1.7, the position of the object focal point of the second lens unit cannot be made to coincide with that of the aperture stop. Thus, it is favorable to satisfy Eq. (4).

In addition, if the condenser lens system is constructed to satisfy Eq. (5), the axial chromatic aberration of the second lens unit can be favorably corrected. By eliminating chromatic aberration, the production of unevenness of color is obviated and an ideal Köhler illumination optical system can be realized. It is more desirable that an aspherical surface is used in the second lens units because spherical aberration can be corrected more effectively.

As mentioned above, according to the present invention, a high-performance illumination optical system for microscopes can be provided which holds the amount of light in the marginal portion to the value close to the theoretical value with respect to the amount of light on the optical axis and obviates the shortage of the amount of light in the marginal portion and unevenness of illumination and color. Also, although the illumination optical system for microscopes of the present invention has a marked effect in particular when used as an illumination optical system for low magnification, the present invention is not necessarily limited to this application only.

In accordance with the embodiments shown, the present invention will be explained below.

Figure 4A:
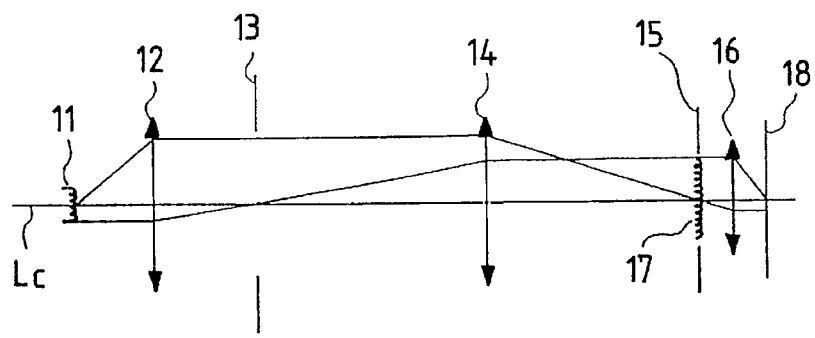
FIGS. 4A and 4B are views for explaining the principle of an illumination optical system according to the present invention with respect to high and low magnifications, respectively.

FIG. 4A shows the arrangement of an illumination optical system for high magnification. This optical system includes, in order from the side of incidence of light, a light source 11, a collector lens 12, a field stop 13, a window lens 14, a high-magnification aperture stop 15, and a high-magnification condenser lens system 16 which are arranged on the optical axis $L_c$. Light emitted from the light source 11 forms a source image 17 adjacent to the high-magnification aperture stop 15 by the collector lens 12 and the window lens 14. Further, this image is projected close to the pupil position of an objective lens, not shown, by the high-magnification condenser lens system 16. The field stop 13 is projected on a sample surface 18 through the window lens 14 and the high-magnification condenser lens system 16.

Figure 4B:
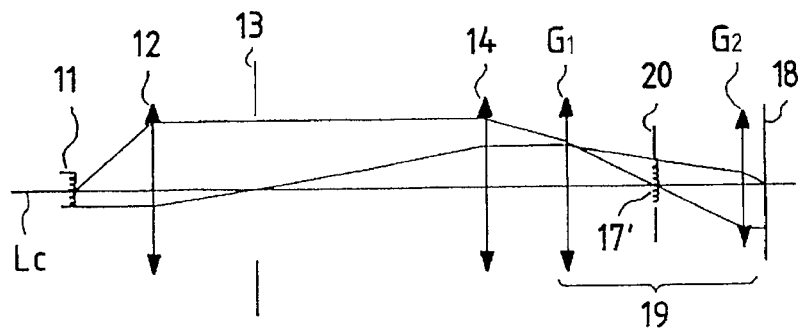

FIG. 4B depicts the arrangement of an illumination optical system for low magnification, which is different from the illumination optical system for high magnification shown in FIG. 4A in arrangement behind the window lens 14. Specifically, behind the window lens 14, in order from the side of incidence of light, the first lens unit $G_1$ of a low-magnification condenser lens system 19, a low-magnification aperture stop 20, and the second lens unit $G_2$ of the low-magnification condenser lens system 19 are arranged along the optical axis $L_c$. Light emitted from the light source 11 forms a source image 17' close to the low-magnification aperture stop 20 through the collector lens 12, the window lens 14, and the first lens unit $G_1$ of the low-magnification condenser lens system. Further, this image is projected adjacent to the pupil position of the objective lens, not shown, by the second lens unit $G_2$ of the low-magnification condenser lens system 19. The field stop 13 is projected on the sample surface 18 by the window lens 14 and the first and second lens units $G_1$ and $G_2$ of the low-magnification condenser lens system 19.

Thus, in the illumination optical system for low magnification, the low-magnification condenser lens system 19 is constructed with two lens units, the first lens unit $G_1$ of which is made to function as a relay lens, and thereby the source image 17' is shifted from the sample surface 18 toward the window lens 14. Additionally, the placement of the low-magnification aperture stop 20 at the position of the source image 17' enables the second lens system $G_2$ of the condenser lens system 19 to have a long focal length.

Furthermore, in the illumination optical system of the present invention, as shown in FIGS. 4A and 4B, the arrangement behind the window lens 14 can be selectively replaced (namely, "the high-magnification aperture stop 15 and the high-magnification condenser lens system 16" can be replaced with "the low-magnification condenser lens system 19 including the first and second lens units $G_1$ and $G_2$ and the low-magnification aperture stop 20").

Thus, when the illumination optical system of the present invention is used, the Köhler illumination can be favorably effected by a single optical system at either high or low magnification.

Next, a detailed description will be given of the arrangement of the low-magnification condenser lens system used in the illumination optical system of the present invention.

Figure 5:
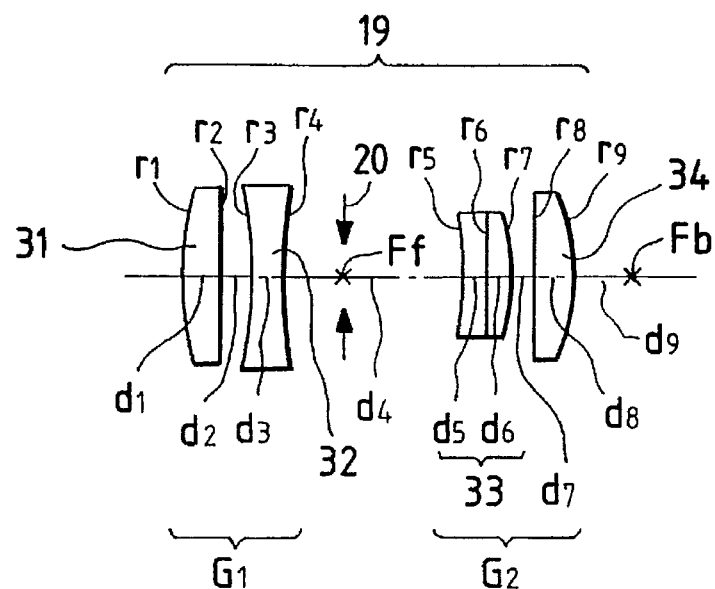
FIG. 5 is a view showing an example of the arrangement, developed along the optical axis, of a low-magnification condenser lens system used in the illumination optical system for microscopes of the present invention.

As shown in FIG. 5, the low-magnification condenser lens system 19 includes, in order from the side of incidence of light, the first lens unit $G_1$ composed of a positive lens 31 and a negative lens 32, having a positive power as a whole, and the second lens unit $G_2$ composed of a negative doublet lens 33 configured by cementing a negative lens to a positive lens and a positive lens 34, having a positive power as a whole. Moreover, the low-magnification aperture stop 20 is placed between the first and second lens units $G_1$ and $G_2$ so as to coincide with the object focal point $F_f$ of the second lens unit $G_2$.

The following is the numerical data of lenses constituting the low-magnification condenser lens system 19.

| | | | |
|---|---|---|---|
| $r_1 = 27.892$ | | | |
| | $d_1 = 5.3$ | $n_1 = 1.7725$ | $v_1 = 49.6$ |
| $r_2 = \infty$ | | | |
| | $d_2 = 2.34$ | | |
| $r_3 = -92.482$ | | | |
| | $d_3 = 2.8$ | $n_3 = 1.74077$ | $v_3 = 27.79$ |
| $r_4 = -92.482$ | | | |
| | $d_4 = 48.92$ | | |
| $r_5 = -19.919$ | | | |
| | $d_5 = 2.45$ | $n_5 = 1.84666$ | $v_5 = 23.78$ |
| $r_6 = \infty$ | | | |
| | $d_6 = 5.55$ | $n_6 = 1.59551$ | $v_6 = 39.21$ |
| $r_7 = -18.184$ | | | |
| | $d_7 = 0.2$ | | |
| $r_8 = \infty$ | | | |
| | $d_8 = 3.59$ | $n_8 = 1.7725$ | $v_8 = 49.6$ |
| $r_9 = -34.61$ | | | |
| | $d_9 = 3.8$ | | |

Focal length $f_1$ of the first lens unit $G_1$=41.7 Focal length $f_2$ of the second lens unit $G_2$=69.9 Focal length f of the condenser lens system 19=78.3 Distance L from the foremost surface of the condenser lens system 19 to the rear focal point $F_b$ thereof=74.94 Effective illumination area D of the object surface =22

Figure 6:
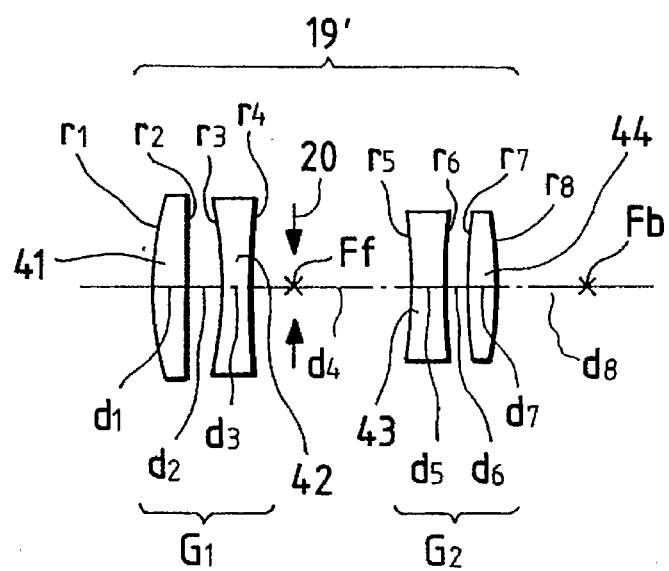
FIG. 6 is a view showing another example of the arrangement, developed along the optical axis, of a low-magnification condenser lens system used in the illumination optical system for microscopes of the present invention.

As shown in FIG. 6, a low-magnification condenser lens system 19' comprises, in order from the side of incidence of light, the first lens unit $G_1$ composed of a positive lens 41 and a negative lens 42, having a positive power as a whole, and the second lens unit $G_2$ composed of a negative lens 43 and a positive lens 44, having a positive power as a whole. Moreover, the low-magnification aperture stop 20 is placed between the first and second lens units $G_1$ and $G_2$ so as to coincide with the object focal point $F_f$ of the second lens unit $G_2$.

The following is the numerical data of lenses constituting the low-magnification condenser lens system 19'.

| | | |
|---|---|---|
| $r_1 = 28.76$ | | |
| | $d_1 = 4.47\, n_1 = 1.7725$ | $v_1 = 49.6$ |
| $r_2 = \infty$ | | |
| | $d_2 = 3.33$ | |
| $r_3 = -79.81$ | | |
| | $d_3 = 3.01\, n_3 = 1.74077$ | $v_3 = 27.79$ |
| $r_4 = 113.87$ | | |
| | $d_4 = 50.0$ | |
| $r_5 = -137.89$ | | |
| | $d_5 = 3.64\, n_5 = 1.80518$ | $v_5 = 25.43$ |
| $r_6 = 38.71$ | | |
| | $d_6 = 2.2$ | |
| $r_7 = 65.86$ | | |
| | $d_7 = 4.5\quad n_7 = 1.7865$ | $v_7 = 50.0$ |
| $r_8 = -22.48$ | | |
| | $d_8 = 3.8$ | |

Focal length $f_1$ of the first lens unit $G_1$=71.8 Focal length $f_2$ of the second lens unit $G_2$=40.63 Focal length f of the condenser lens system 19' =73.1 Distance L from the foremost surface of the condenser lens system 19' to the rear focal point $F_b$ thereof=74.92

Effective illumination area D of the object surface=22

TABLE 2

| | | Illumination optical system of the present invention | |
|---|---|---|---|
| | Theoretical value | When AS is opened (*1) | When AS is stopped down (*2) |
| On-axis | 100 | 100 | 100 |
| Middle | 99 | 98 | 98 |
| Margin | 96 | 95 | 95 |

In Table 2, the theoretical values that the amount of light on the optical axis is taken as 100 and the amount of light at each image height is taken as zero in aberration, are compared with the amounts of light of the illumination optical system according to the present invention. The column of the illumination optical system of the present invention gives a case (*1) where the low-magnification aperture stop (AS) 20 is set so that the numerical aperture (NA) is 0.08 and another case (*2) where the AS is stopped down so that the NA is 0.04, under the conditions that the NA of the objective lens is 0.04 and the chief ray at the maximum image height is parallel to the optical axis.

It is seen from the above data that when the illumination optical system of the present invention is used, the numerical data close to the theoretical values can be derived. Hence, unlike the conventional illumination optical system already mentioned, there is no difference between the amount of light on the optical axis compared to the marginal portion, brightness at the middle image height is not reduced, and the reduction of the amount of light and unevenness of illumination can be completely obviated.

Also, the use of an aspherical surface, although not particularly shown in each embodiment, is favorable because if the aspherical surface is used in the second lens unit of the condenser lens system, spherical aberration can be corrected more effectively. The low-magnification condenser lens system in the present invention is suitable for a condenser lens as low as about 1–4×in magnification in terms of that of an objective lens.

What is claimed is:

1. An illumination optical system for microscopes used as a transmissive Köhler illumination optical system having a light source, a condenser lens system, and an aperture stop, said condenser lens system, in order from a side of incidence of light, comprising:

a first lens unit composed of a positive lens and a negative lens, having a positive power as a whole; and a second lens unit composed of a negative lens and a positive lens, having a positive power as a whole, a foremost surface of said second lens unit having a concave side which faces incident light, said aperture stop being disposed between said first lens unit and said second lens unit.

2. An illumination optical system for microscopes according to claim 1, further satisfying conditions:

$$f_1/f_2 > 0.5$$
$$f/L > 0.9$$
$$f_2/D > 1.7$$

where $f_1$ is a focal length of said first lens unit, $f_2$ is a focal length of said second lens unit, f is an entire focal length of said condenser lens system, L is a distance from a foremost surface of said condenser lens system to a rear focal point of said condenser lens system, and D is a diameter of an effective illumination area of an object surface.

3. An illumination optical system for microscopes according to claim 1, further satisfying conditions:

$$vP > 45,\ vn < 30$$

where vP is a maximum Abbe's number of the positive lens included in said second lens unit and vn is a minimum Abbe's number of the negative lens included in said second lens unit.

4. An illumination optical system for microscopes according to claim 1, wherein a rearmost surface of said second lens unit has a concave side which faces the incident light.

5. An illumination optical system for microscopes according to claim 4, further satisfying conditions:

$$f_1/f_2 > 0.5$$
$$f/L > 0.9$$
$$f_2/D > 1.7$$

where $f_1$ is a focal length of said first lens unit, $f_2$ is a focal length of said second lens unit, f is an entire focal length of said condenser lens system, L is a distance from a foremost surface of said condenser lens system to a rear focal point of said condenser lens system, and D is a diameter of an effective illumination area of an object surface.

6. An illumination optical system for microscopes according to claim 4, further satisfying conditions:

$\nu P > 45, \nu n < 30$ where $\nu P$ is a maximum Abbe's number of the positive lens included in said second lens unit and $\nu n$ is a minimum Abbe's number of the negative lens included in said second lens unit.

7. An illumination optical system for microscopes used as a transmissive Köhler illumination optical system having a light source, a condenser lens system, and an aperture stop, said condenser lens system, in order from a side of incidence of light, comprising:

a first lens unit composed of a positive lens and a negative lens, having a positive power as a whole; and a second lens unit composed of a negative lens and a positive lens, having a positive power as a whole, said aperture stop being disposed between said first lens unit and said second lens unit, and said illumination optical system satisfying conditions:

$R_1/R_2 > 0$ $f_1/f_2 > 0.5$ $f/L > 0.9$ $f_2/D > 1.7$ where $R_1$ is a radius of curvature of a foremost surface of said second lens unit, $R_2$ is a radius of curvature of a rearmost surface of said second lens unit, $f_1$ is a focal length of said first lens unit, $f_2$ is a focal length of said second lens unit, $f$ is an entire focal length of said condenser lens system, $L$ is a distance from a foremost surface of said condenser lens system to a rear focal point of said condenser lens system, and $D$ is a diameter of an effective illumination area of an object surface.

8. An illumination optical system for microscopes according to claim 7, further satisfying conditions:

$\nu P > 45, \nu n < 30$ where $\nu P$ is a maximum Abbe's number of the positive lens included in said second lens and $\nu n$ is a minimum Abbe's number of the negative lens included in said second lens unit.

* * * * *